United States Patent [19]

Tajima et al.

[11] Patent Number: 4,525,654
[45] Date of Patent: Jun. 25, 1985

[54] TAPE TRANSPORT CONTROL UNIT

[75] Inventors: Fujio Tajima; Hiromu Hirai, both of Ibaraki, Japan

[73] Assignee: Hitachi, Ltd., Tokyo, Japan

[21] Appl. No.: 447,796

[22] Filed: Dec. 8, 1982

[30] Foreign Application Priority Data

Dec. 9, 1981 [JP] Japan ................................ 56-196786

[51] Int. Cl.³ .............................................. H02P 5/46
[52] U.S. Cl. ....................................... 318/7; 242/75.51
[58] Field of Search ...................... 318/6, 7; 242/75.51, 242/75.52, 186, 191, 203

[56] References Cited

U.S. PATENT DOCUMENTS

| | | | |
|---|---|---|---|
| 3,984,868 | 10/1976 | Ragle et al. ...................... | 242/186 X |
| 4,015,799 | 4/1977 | Koski et al. ........................ | 318/7 X |
| 4,121,138 | 10/1978 | Flint et al. ............................... | 318/7 |
| 4,125,881 | 11/1978 | Eige et al. ........................... | 318/7 X |
| 4,172,231 | 10/1979 | d'Alayer de Costemore ..... | 242/191 X |
| 4,338,645 | 7/1982 | Mohri et al. .................. | 242/75.51 X |
| 4,398,227 | 8/1983 | Anderson ........................... | 318/7 X |
| 4,399,355 | 8/1983 | Satoh et al. .................... | 242/75.51 X |
| 4,448,368 | 5/1984 | Skalko ............................... | 318/7 X |

FOREIGN PATENT DOCUMENTS 54-111806  9/1979  Japan .................... 242/186

OTHER PUBLICATIONS

Thorpe, IBM Technical Disclosure Bulletin, vol. 15, No. 8, Jan. 1973, pp. 2603-2605.
Penny, ibid, vol. 14, No. 6, Nov. 1971, pp. 1863-1864.

Primary Examiner—William M. Shoop
Assistant Examiner—Bentsu Ro
Attorney, Agent, or Firm—Antonelli, Terry & Wands

[57] ABSTRACT

A magnetic tape in a reel-to-reel magnetic apparatus is transported directly from a supply reel to a take-up reel without a mechanical buffer or a vacuum column buffer.

Separate drive motors are coupled to the respective reels and driven by predetermined target signals.

Tape roll radii on the respective reels are determined from the amount of tape movement, that is, rotation angles of the reels and a known tape thickness, and reel moments are determined from the tape roll radii to determine a total amount of tape wound on the reels, that is, a reel status amount.

During the tape transport, the tape roll radii and the reel moments change from time to time. Operation band widths or dynamic responses of the reel drive systems are equalized in accordance with the change of the tape roll radii and the reel moments so that the reel drive systems are cooperatively controlled.

11 Claims, 7 Drawing Figures

TAPE TRANSPORT CONTROL UNIT

BACKGROUND OF THE INVENTION

1. Field of the Invention

The present invention relates to a magnetic tape apparatus, and more particularly to a magnetic tape transport control unit in a reel-to-reel magnetic tape apparatus in which a tape is directly transported between reels without a mechanical buffer or a vacuum column buffer.

2. Description of the Prior Art

As a recording unit for recording and reproducing information, a magnetic tape apparatus which transports a magnetic tape by a magnetic tape transport mechanism having a mechanical buffer or a vacuum column buffer is frequently used. However, in the magnetic tape apparatus having such a magnetic tape transport unit, a cost is high because of the buffer unit, an entire unit is large in size and a noise is high. In order to resolve those problems, a reel-to-reel magnetic tape apparatus which has no buffer and transports the magnetic tape directly from a supply reel to a take-up reel is offered. In this apparatus, an entire unit is small in size because of lack of the buffer and a noise problem is also resolved. On the other hand, since a radius and a moment of a magnetic tape roll wound on each of the reels varies as the magnetic tape is fed from the supply reel, it is necessary to control the transport of the magnetic tape such that the magnetic tape is transported from one reel to the other under a constant tensional force and a constant speed.

To this end, for example, a tachometer is coupled to each of the supply reel and the take-up reel, or a tachometer having a fine scale is coupled to a tape transport path between the reels, and the changes of the radii and the moments of the tape rolls are determined as the tape is transported in order to maintain the tape tension and the tape speed constant. This method, however, operates well when a tape acceleration is low and the tape is started and stopped relatively slowly, but when the tape acceleration increases and the tape is transported at a high speed, a slip of the tape occurs at the tachometer mounted in the tape transport path and the tape tension and the tape speed cannot be precisely controlled.

In another approach, a tachometer is coupled to each of the supply reel and the take-up reel. One of the tachometers produces a pulse for each relatively large predetermined rotation angle while the other produces a pulse for each predetermined rotation angle which is smaller than the above predetermined rotation angle. Based on signals from those tachometers, a radius of tape roll on one of the reels is determined, and a radius of tape roll on the other reel is determined based on the determined radius of the one tape roll and precalculated constants relating to an actual thickness and a total length of the tape, and a tape speed, a tape acceleration and a tape tension are determined based on the determined radii and a reference tape speed to maintain the tape tension and the tape speed constant during the operation. In this method, however, the radii of the tape rolls on the respective reels can be exactly detected when the tape tension between the reels is constant but they cannot be exactly detected when the tape slacken. As a result, an overall performance is lowered because of a tape roll radius error. Further, when the tape tension between the reels is not stable and the tape speed changes, an error in the detected tape speed increases.

On the other hand, in recent years, a high density recording and a high speed recording of information have been demanded. In order to satisfy the demand, it is necessary to solve the above problems and control the magnetic tape tension and speed. However, a control method which satisfies the requirements has not been known so far.

SUMMARY OF THE INVENTION

It is an object of the present invention to provide a magnetic tape transport unit in a reel-to-reel magnetic tape apparatus which makes servo systems of the respective reels to equally respond to one target command to cooperatively control the reels so that the magnetic tape is transported from one reel to the other at a constant tape tension and a constant tape speed and without a slip in an acceleration operation.

In the reel-to-reel magnetic tape apparatus, the tape tension depends on the tape supply of the reels. A physical characteristic of the tape is that of a resilient material and hence the tape tension is proportional to an amount of tape expansion. Accordingly, it is desirable to use an amount of a tape supply as a control amount. The radii and the moments of the tape rolls on the respective reels change from time to time as the tape is supplied and taken up, but a basic servo system may be constructed by a servo system which is less susceptable to the change of moment of the reel or has a constant dynamic response of a reel servo mechanism.

The tape transport control unit of the present invention comprises reel drive means for driving the respective reels in accordance with a predetermined target signal by separate drive motors coupled to the respective reels, sensing means for sensing radii of the tape rolls on the reels to provide an indication corresponding to a predetermined increment of the tape roll radius, processing and storage means for calculating compensation constants to equalize operation band widths or dynamic responses of the respective reel drive means in response to the predetermined increment of the tape roll radius from the sensing means, and coupling means for selecting a compensation constant corresponding to the instantaneous tape roll radii from the compensation constants calculated by the processing and storage means and setting the selected compensation constant to the reel drive means, whereby the operation band widths or the dynamic responses of the reel drive means of the respective reel servo systems are equalized in response to the change of the tape roll radii to cooperatively control the reel servo systems.

DESCRIPTION OF THE PREFERRED EMBODIMENTS

Figure 1:
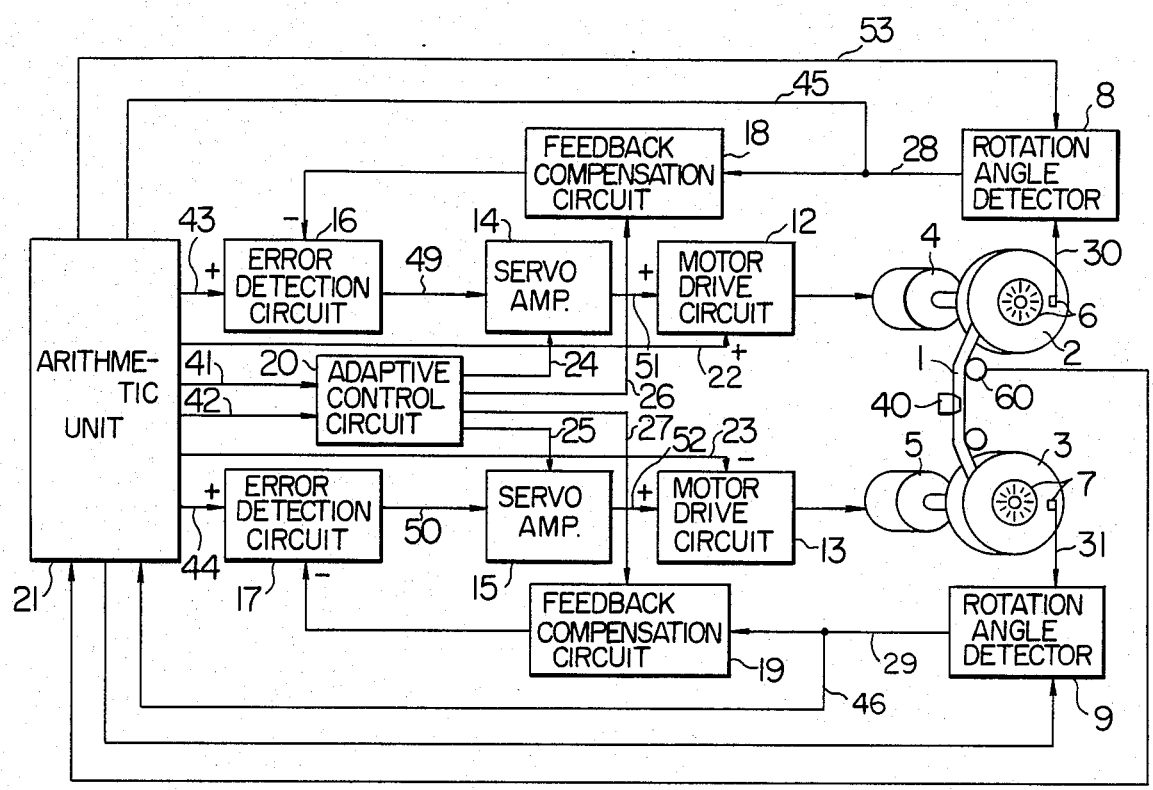
FIG. 1 shows a configuration of one embodiment of a tape transport control unit of a magnetic tape apparatus of the present invention.

One embodiment of the tape transport control unit of the present invention is now explained with reference to FIG. 1. A magnetic tape 1 is transported from a supply reel 3 directly to a take-up reel 2 without routing a buffer. The take-up reel 2 and the supply reel 3 have driving reel motors 4 and 5 coupled to rotating shafts thereof. Tachometers 6 and 7 with fine scales are coupled to the take-up reel 2 and the supply reel 3, respectively, to detect rotation angles and angular velocities of the take-up reel 2 and the supply reel 3, respectively. Output pulse signals 30 and 31 from the tachometers 6 and 7 are supplied to rotation angle detectors 8 and 9, respectively. The rotation angle detectors 8 and 9 each detects the rotation angle of the reel 2 or 3 and produces a signal with a sign representing a rotation direction for each revolution of the reel. The output signals from the rotation angle detectors 2 and 3 are supplied to an arithemtic unit 21 as signals 28, 45, 29 and 46 for determining a total amount of the magnetic tape 1 wound on the reels 2 and 3, that is, a status amount of the reels. The arithmetic unit 21, when it receives those signals, calculates radii of tape rolls on the reels 2 and 3, that is, tape roll radii based on an amount of tape movement, that is, the rotation angles of the reels 2 and 3 and a preset tape thickness. It also calculates reel moments based on the tape roll radii. In this manner, the status amounts of the reels 2 and 3 are determined.

The tape roll radii are necessary to control the tape speed and the reel moments affect to a dynamic response such as a tape speed characteristic when the tape is transported.

If the responses of the reels 2 and 3 differ from each other, the reel characteristics are different and it causes a tape tension variation.

In order to control the speed of the tape 1 at a constant speed, the arithmetic unit 21 produces target signals 43 and 44 for reel rotation angles in accordance with the instantaneous tape roll radii of the reels 2 and 3 and supplies them to error detection circuits 16 and 17, respectively. On the other hand, the actual rotation angles of the reels 2 and 3 are converted to the rotation angle signals 28 and 29 by the rotation angle detectors 8 and 9, respectively, and the signals 28 and 29 are supplied to feedback compensation circuits 18 and 19, respectively. The feedback compensation circuits 18 and 19 adjust the feedback signals so that reel servo systems are stabilized. The feedback signals are then supplied to the error detection circuits 16 and 17, respectively, with a minus sign. Error signals 49 and 50 detected are supplied to servo amplifiers 14 and 15 for motors 4 and 5, respectively. Motor drive circuits 12 and 13 add servo amplifier signals 51 and 52 which were amplified by a gain factor of K to tensional torque compensation signals 22 and 23 for compensating tape tensional torques applied to the reels 2 and 3 and produce drive signals for driving the reel motors 4 and 5, respectively. The tensional torque compensation signals 22 and 23 are derived in the arithmetic unit 21 from the instantaneous tape roll radii. Moment signals 41 and 42 which contain information on the reel moments are supplied to an adaptive control circuit 20. The adaptive control circuit 20 controls gains of the servo amplifiers 14 and 15 and the feedback compensation circuits 18 and 19 to optimum gains such that the dynamic responses of the reel servo systems assume a predetermined value for the instantaneous reel moments.

The target signals 43 and 44 for driving the reels 2 and 3 are always supplied, during the tape transport, from the arithmetic unit 21 to the error detection circuits 16 and 17, respectively. When the calculated tape roll radii are updated as the reels 2 and 3 are rotated, the target signals 43 and 44, the tensional torque compensation signals 22 and 23 and the moment signals 41 and 42 from the arithmetic unit 21 are updated. The adaptive control circuit 20 updates the gains of the servo amplifiers 14 and 15 and the feedback compensation circuits 18 and 19 in response to the updated moment signals in the same manner as described above.

In order to more clearly explain the preferred embodiment of the present invention, each of the elements will now be explained in detail. The tape roll radii are derived from the rotation angles of the reels. Whenever the tape is wrapped on the tape once, the tape roll radius increases by the amount corresponding to the tape thickness. Thus, the tape roll radii can be derived by detecting the rotation angles of the reels by the reel tachometers 6 and 7 and determining a total rotation angle. In this derivation process, the tape thickness is preset in the arithemtic unit 21. Major elements of the reel rotation angle detectors 8 and 9 are counters for counting the reel tachometer pulses 30 and 31. The counters are controlled by counter control signals 53 and 54 from the arithmetic unit 21. The method for detecting the tape roll radius is not an essential part of the present invention. Another tape roll radius detection method may be used in combination. The arithmetic unit 21 can be adapted to the modification of the detection method.

The tape tensional torques applied to the reel motors 4 and 5 are determined from products of a predetemined reference tape tension and the instantaneous tape roll radii. The signal for creating the torques to compensate for the tape tensional torques in the reel motors 4 and 5, that is, the tensional torque compensation signals 22 and 23 can be derived from torque constants of the reel motors 4 and 5. In actuality the tensional torque compensation amounts are a function of the tape roll radii, and hence the amounts are previously calculated and stored in a memory, and the instantaneous tensional torque compensation signals 22 and 23 can be derived by referring to the memory using the tape roll radius as an address.

A theroretical background of an algorithm for determining the optimum gains of the servo amplifiers 14 and 15 and the feedback compensation circuits 18 and 19 is now explained. A transfer function which is an index to indicate the dynamic response from the target to the reel rotation angle in the reel servo system is generally expressed by an equation (1), assuming that transfer functions H(S) of the feedback compensation circuits 18 and 19 are given by $H(S) = C_1 S + C_2$ $$\frac{\textcircled{H}(S)}{V_\theta(S)} = \frac{\frac{KK_i}{LJ}}{S^3 + \left(\frac{R}{L} + \frac{B}{J} + \frac{KC_1K_T}{LJ}\right)S^2 + \left(\frac{RB}{LJ} + \frac{KK_TC_2 + KK_T}{LJ}\right)S + \frac{KK_T}{LJ}} \quad (1)$$

where
- K: gain of servo amplifier
- $C_1$: compensation constant 1 of feedback compensation circuit
- $C_2$: compensation constant 2 of feedback compensation circuit
- R: motor terminal-to-terminal resistance
- $K_T$: motor torque constant
- L: motor inductance
- $K_e$: motor induced voltage constant
- B: motor viscosity damping coefficient
- J: motor reel moment load The equation (1) is a third order equation and it is converted as a product of a first order term and a second order term as shown in equation (2).

$$\frac{\textcircled{H}(S)}{V_\theta(S)} = \frac{P\omega_n^2}{(S + P)(S^2 + 2\xi\omega_n S + \omega_n^2)} \quad (2)$$

where
- $\omega_n$: operation band width of reel servo system
- $\xi$: attenuation coefficient of reel servo system
- $-P$: real pole of reel servo system In the equation (2), as the reel moment load J changes, the transfer frunction of the reel servo system changes. If the transfer function of the reel servo system is to be constant for the change of the reel moment load J, for example, if the constants $\omega_n$, $\xi$ and P in the equation (2) are fixed and the equation (2) is set as a target transfer function, the gain K of the servo amplifiers 14 and 15 and the compensation constants $C_1$ and $C_2$ of the feedback compensation circuits 18 and 19 for satisfying the above are determined by comparing the equations (1) and (2), as shown by equations (3).

$$\left.\begin{array}{l} K = \frac{LJ}{K_T} P\omega_n^2 \\[6pt] C_1 = \dfrac{2\xi\omega_n + P + \frac{R}{L} + \frac{B}{J}}{P\omega_n^2} \\[6pt] C_2 = \dfrac{2\xi\omega_n P + \omega_n^2 - \frac{RB}{LJ}}{P\omega_n^2} = \dfrac{K_E}{K} \end{array}\right\} \quad (3)$$

Figure 2:
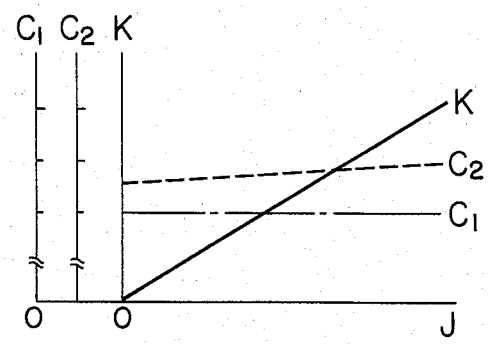
FIG. 2 shows a relationship of a servo amplifier and a feedback compensation circuit to a change of a reel moment in the embodiment of FIG. 1.

FIG. 2 shows results of calculations of the gain K of the servo amplifiers 14 and 15 and the compensation constants $C_1$ and $C_2$ of the feedback compensation circuits 18 and 19 for the change of the reel moment J, in accordance with the equations (3). In the adaptive control circuit 20, the operation characteristic shown in FIG. 3 is stored in a memory and the optimum gain K of the servo amplifiers 14 and 15 and the optimum compensation constants $C_1$ and $C_2$ of the feedback compensation circuits 18 and 19 are determined by utilizing the moment signals 41 and 42 as address signals, or the tape roll radii may be used as the address signals instead of the moment signals 41 and 42.

In the present embodiment, the control of the tape tension necessary to correctly read and write information by a magnetic head 40 is effected by controlling a difference between the tape supply amounts of the reels to a constant value. A reference tape tension is initially set in the arithmetic unit as the difference between the tape supply amounts of the reels. In the present invention, a tape tension sensor is not inherently necessary but the tape tension may change by an external disturbance in the tape transport unit. A tape tension sensor 60 is used to control the tape tension precisely for such external factors. When the arithmetic unit 21 detects an error between the signal from the tape tension sensor 60 and the reference tape tension, it corrects the tape supply amounts of the reels 2 and 3 to reduce the tape tension error. Specifically, it is effected by correcting the rotation angle target signals 43 and 44. The tape tension sensor 60 may be of differential transformer type which detects the change of the tension as a displacement of an idling roller arm, or it may be of a type which detects the change of the tension as a change of pressure.

Figure 3A:
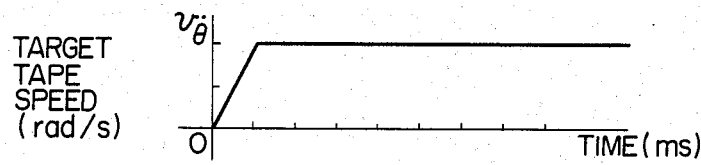
FIGS. 3A–3D show operational characteristics in the embodiment of FIG. 1.
Figure 3B:
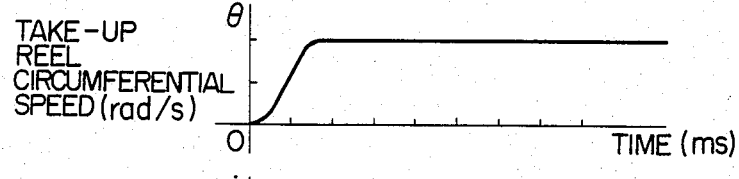
Figure 3C:
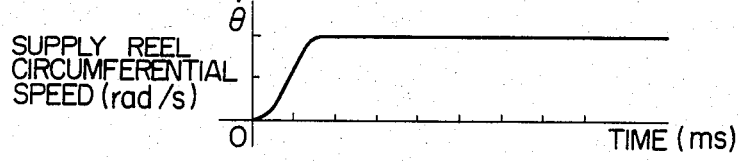
Figure 3D:

In order to illustrate the effectiveness of the present invention, the operation characteristics for the embodiment shown in FIG. 1 are shown in FIGS. 3A-3D. FIG. 3A shows a target tape speed $V_\theta$, FIG. 3B shows a take-up reel circumferential speed $\theta_1$, FIG. 3C shows a supply reel circumferential speed $\theta_2$ and FIG. 3D shows a tape tension variation $\Delta T_f$. The take-up reel circumferential speed $\theta_1$ and the supply reel circumferential speed $\theta_2$ well coincide to each other. As a result, the tape tension variation at the start of the tape is very small.

Figure 4:
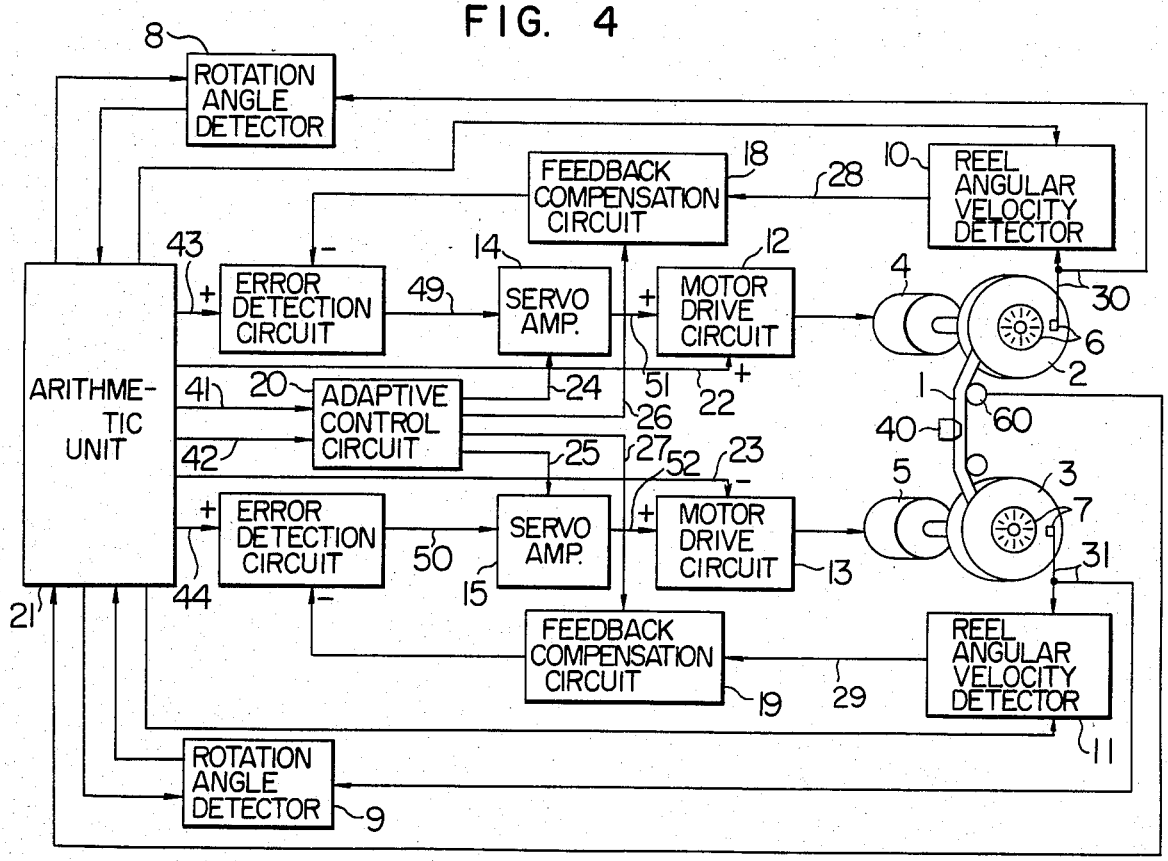
FIG. 4 shows a configuration of another embodiment of the tape transport control unit of the present invention.

The embodiment shown in FIG. 1 selects the rotation angles of the reels 2 and 3 as the control amounts of the reel servo systems. When reel angular velocities are used as the control amounts, a basic configuration is exactly same. FIG. 4 shows a configuration thereof. It comprises reel angular velocity detectors 10 and 11 in addition to the embodiment of FIG. 1. Main elements of the reel angular velocity detectors 10 and 11 are circuits which measures reel tachometer pulse intervals and convert them to angular velocity signals. They may be F/V converters. It should be understood that the target signals 43 and 44 from the arithmetic unit 21 command the reel angular velocities. The transfer function from the target signals 43 and 44 to the reel angular velocities in the reel servo systems is expressed by equation (4).

$$\frac{\textcircled{H}(S)}{V_\theta(S)} = \frac{\frac{KK_T}{LJ}}{S^2 + \left(\frac{B}{L} + \frac{B}{J} + \frac{KK_TC_1}{LJ}\right)S + \frac{1}{LJ}\{RB + K_TK_e + KK_TC_2\}} \quad (4)$$

The equation (4) is simplified as follows.

$$\frac{H(S)}{V_\theta(S)} = \frac{\omega_n^2}{S^2 + 2\xi\omega_n S + \omega_n^2} \tag{5}$$

The optimum gains of the servo amplifiers 14 and 15 and the feedback compensation circuits 18 and 19 to maintain the transfer constant of the equation (4) constant to the change of the reel moment load J are determined by comparing the equations (4) and (5), as shown by equations (6).

$$\left.\begin{array}{l} K = \dfrac{LJ}{K_T}\omega_n^2 \\[6pt] C_1 = \dfrac{LJ}{KK_T}\left(2\xi\omega_n - \dfrac{R}{L} - \dfrac{B}{J}\right) \\[6pt] C_2 = \dfrac{1}{KK_T}\{LJ\omega_n^2 - RB - K_T K_e\} \end{array}\right\} \tag{6}$$

The function of the adaptive control circuit 20 is same as that in FIG. 1.

As described hereinabove, according to the present invention, the reel servo systems of the reel-to-reel magnetic tape apparatus can be cooperatively controlled to adapted to the variation of the tape roll radii. Accordingly, the construction is simplified, the size is reduced and the noise is reduced and the high density and high speed recording of information is attained.

We claim:

1. A tape transport control unit in a magnetic tape apparatus in which a supply reel and a take-up reel are driven by separate motors and a magnetic tape on the supply reel is transported from the supply reel to the take-up reel past a read/write head disposed between the reels without routing a buffer through a substantially constant length path and a reel status amount representing a total amount of the tape on the reels varies from time to time, comprising:
   reel status amount sensing means for sensing the reel status amount of tape roll radii and reel moments of each of said supply reel and said take-up reel;
   reel drive means for comparing a predetermined target signal of each of said supply reel and said take-up reel with a feedback signal obtained by adjusting a signal from said status amount sensing means by means of a feedback compensation circuit, and for driving reel drive motors separately connected to each reel on the basis of the compared signal;
   arithmetic and storage means for calculating and storing gain values and feedback constants of said reel drive means which are compensation constants necessary for equalizing dynamic operations of each reel drive means, in accordance with the reel status amount from each reel status amount sensing means; and
   means for selecting a compensation constant corresponding to the instantaneous tape roll radii from said compensation constants calculated by and stored in said arithmetic and storage means in response to said sensing means and for setting the selected compensation constant as a compensation constant for said reel drive means.

2. A tape transport control unit according to claim 1, wherein said reel status amount sensing means detects the tape roll radii on said reels by rotation angles of said reels to determine the tape roll radii, and determines the reel moments from the tape roll radii.

3. A tape transport control unit according to claim 2 wherein a pulse generator for generating a pulse for each predetermined rotation angle of said reel and a reel rotation angle detector for detecting the reel rotation angle by said pulse are coupled to each of said reels, and output signals from said reel rotation angle detectors are supplied to said arithmetic and storage means to determine the tape roll radii and the reel moments.

4. A tape transport control unit according to claim 1 wherein said reel status amount sensing means detects the tape roll radii on said reels by reel angular velocities to determine the tape roll radii, and determines the reel moments from the tape roll radii.

5. A tape transport control unit according to claim 4 wherein a pulse generator for generating a pulse for each predetermined rotation angle of said reel and a reel angular velocity detector for detecting the reel angular velocity by the signal from said pulse generator are coupled to each of said reels, and output signals from said reel angular velocity detectors are supplied to said arithmetic and storage means to determine the tape roll radii and the reel moments.

6. A tape transport control unit in a magnetic tape apparatus in which a supply reel and a take-up reel are driven by separate motors and a magnetic tape on the supply reel is transported from the supply reel to the take-up reel past a read/write head disposed between the reels without routing a buffer through a substantially constant length path and a reel status amount representing a total amount of the tape on the reel varies from time to time, comprising:
   reel status amount sensing means for sensing the reel status amount of tape rool radii and reel moments of each of said supply reel and said tape-up reel;
   means contacting said tape for detecting a tape tension between said supply reel and said take-up reel;
   reel drive means for comparing a predetermined target signal of each of said supply reel and said take-up reel with a feedback signal obtained by adjusting a signal from said reel status amount sensing means by means of a feedback compensation circuit, and for driving reel drive motors separately connected to each reel on the basis of the compared signal;
   arithmetic and storage means for calculating and storing gain values and feedback constants of said reel drive means which are compensation constants necessary for equalizing dynamic operations of each reel drive means, in accordance with the reel status amount from each reel status sensing means and the detected value from said tape tension detecting means; and
   means for selecting a compensation constant corresponding to the instantaneous tap roll radii from said compensation constants calculated by and stored in said arithmetic and storage means in response to said sensing means and for setting the selected compensation constant as a compensation constant for said reel drive means.

7. A tape transport control unit according to claim 6 wherein said reel status amount sensing means detects the tape roll radii on said reels by rotation angles of said reels to determine the tape roll radii, and determines the reel moments from the tape roll radii.

8. A tape transport control unit according to claim 7 wherein a pulse generator for generating a pulse for each predetermined rotation angle of said reel and a reel rotation angle detector for detecting the reel rotation angle by said pulse are coupled to each of said reels, and output signals from said reel rotation angle detectors are supplied to said arithmetic and storage means to determine the tape roll radii and the reel moments.

9. A tape transport control unit according to claim 6 wherein said reel status amount sensing means detects the tape roll radii on said reels by reel angular velocities to determine the tape roll radii, and determines the reel moments from the tape roll radii.

10. A tape transport control unit according to claim 9 wherein a pulse generator for generating a pulse for each predetermined rotation angle of said reel and a reel angular velocity detector for detecting the reel angular velocity by the signal from said pulse generator are coupled to each of said reels, and output signals from said reel angular velocity detectors are supplied to said arithmetic and storage means to determine the tape roll radii and the reel moments.

11. A tape transport control unit according to claim 6, wherein said tape tension detecting means include a tape tension sensor contacting the tape between said reels, an output of said sensor is supplied to said arithmetic and storage means, and said arithmetic and storage means detects an error between the sensor output and a reference tape tension and corrects the rotation angle target signal for said reel motor in accordance with the error.

* * * * *